US008327442B2

(12) United States Patent
Herz et al.

(10) Patent No.: US 8,327,442 B2
(45) Date of Patent: Dec. 4, 2012

(54) SYSTEM AND METHOD FOR A DISTRIBUTED APPLICATION AND NETWORK SECURITY SYSTEM (SDI-SCAM)

(76) Inventors: Frederick S. M. Herz, Warrington, PA (US); Walter Paul Labys, Salt Lake City, UT (US)

( * ) Notice: Subject to any disclaimer, the term of this patent is extended or adjusted under 35 U.S.C. 154(b) by 315 days.

(21) Appl. No.: 10/746,825

(22) Filed: Dec. 24, 2003

(65) Prior Publication Data

US 2006/0053490 A1    Mar. 9, 2006

Related U.S. Application Data

(63) Continuation-in-part of application No. 10/693,148, filed on Oct. 23, 2003, now abandoned.

(60) Provisional application No. 60/436,363, filed on Dec. 24, 2002.

(51) Int. Cl.
*G06F 11/30* (2006.01)

(52) U.S. Cl. ............... 726/23; 726/22; 726/24; 726/25; 713/188

(58) Field of Classification Search .............. 726/22–25; 713/182, 188
See application file for complete search history.

(56) References Cited

U.S. PATENT DOCUMENTS

| 6,088,804 | A | * | 7/2000 | Hill et al. ......................... 726/25 |
| 6,122,743 | A | * | 9/2000 | Shaffer et al. ..................... 726/3 |
| 6,158,010 | A | * | 12/2000 | Moriconi et al. ................. 726/1 |
| 6,301,668 | B1 | * | 10/2001 | Gleichauf et al. ............... 726/25 |
| 6,345,299 | B2 | * | 2/2002 | Segal ............................. 709/229 |
| 6,347,338 | B1 | * | 2/2002 | Segal ............................. 709/229 |
| 6,353,385 | B1 | * | 3/2002 | Molini et al. .................. 340/506 |
| 6,405,318 | B1 | * | 6/2002 | Rowland ......................... 726/22 |
| 6,530,024 | B1 | * | 3/2003 | Proctor ........................... 726/23 |
| 6,597,777 | B1 | * | 7/2003 | Ho ................................. 379/133 |
| 6,663,000 | B1 | * | 12/2003 | Muttik et al. .................. 235/375 |
| 6,711,615 | B2 | * | 3/2004 | Porras et al. .................. 709/224 |
| 6,725,377 | B1 | * | 4/2004 | Kouznetsov .................... 726/23 |
| 6,769,066 | B1 | * | 7/2004 | Botros et al. .................... 726/23 |
| 6,772,349 | B1 | * | 8/2004 | Martin et al. .................... 726/22 |
| 6,952,779 | B1 | * | 10/2005 | Cohen et al. .................... 726/22 |
| 6,996,843 | B1 | * | 2/2006 | Moran ............................. 726/23 |
| 7,013,330 | B1 | * | 3/2006 | Tarbotton et al. ............. 709/219 |
| 7,058,968 | B2 | * | 6/2006 | Rowland et al. ................. 726/1 |
| 7,181,769 | B1 | * | 2/2007 | Keanini et al. .................. 726/23 |
| 7,185,368 | B2 | * | 2/2007 | Copeland, III .................. 726/25 |
| 7,222,366 | B2 | * | 5/2007 | Bruton et al. ................... 726/23 |
| 7,228,564 | B2 | * | 6/2007 | Raikar et al. .................... 726/23 |
| 7,594,260 | B2 | * | 9/2009 | Porras et al. .................... 726/13 |

(Continued)

OTHER PUBLICATIONS

Denning, Dorothy E., "An Intrusion-Detection Model", IEEE Transactions on Software Engineering, vol. Se-13, No. 2, Feb. 1987, pp. 222-232.*

(Continued)

*Primary Examiner* — Yin-Chen Shaw
(74) *Attorney, Agent, or Firm* — Woodcock Washburn LLP

(57) ABSTRACT

This document discloses the architecture and proposed application of a highly distributed network security system. Using a combination of intelligent client-side and server-side agents, redundant memory arrays, duplicate network connections, and a variety of statistical analytics, which are cleverly designed to anticipate, counteract and defeat likely strategic designs, behaviors and adaptations of these threats which may be intended to evade or even disable the network security system, this system serves to detect, prevent, and repair a wide variety of network intrusions.

33 Claims, 1 Drawing Sheet

U.S. PATENT DOCUMENTS

| | | |
|---|---|---|
| 2002/0059078 A1* | 5/2002 | Valdes et al. ............... 705/1 |
| 2002/0066034 A1* | 5/2002 | Schlossberg et al. ......... 713/201 |
| 2003/0051163 A1* | 3/2003 | Bidaud ........................ 713/201 |
| 2003/0101260 A1* | 5/2003 | Dacier et al. ................ 709/224 |
| 2003/0115322 A1* | 6/2003 | Moriconi et al. ............ 709/224 |
| 2003/0145225 A1* | 7/2003 | Bruton et al. ................ 713/201 |
| 2004/0123142 A1* | 6/2004 | Dubal et al. ................. 713/201 |
| 2004/0153666 A1* | 8/2004 | Sobel .......................... 713/201 |
| 2004/0165588 A1* | 8/2004 | Pandya ........................ 370/389 |
| 2004/0215972 A1* | 10/2004 | Sung et al. ................... 713/201 |
| 2004/0250060 A1* | 12/2004 | Diep et al. ................... 713/155 |
| 2005/0257247 A1* | 11/2005 | Moriconi et al. ............. 726/2 |

OTHER PUBLICATIONS

Anderson et al., "Next Generation Intrusion Detection Expert System (NIDES) A Summary", SRI-CSL-97-07, May 1995. pp. 1-35.*

* cited by examiner

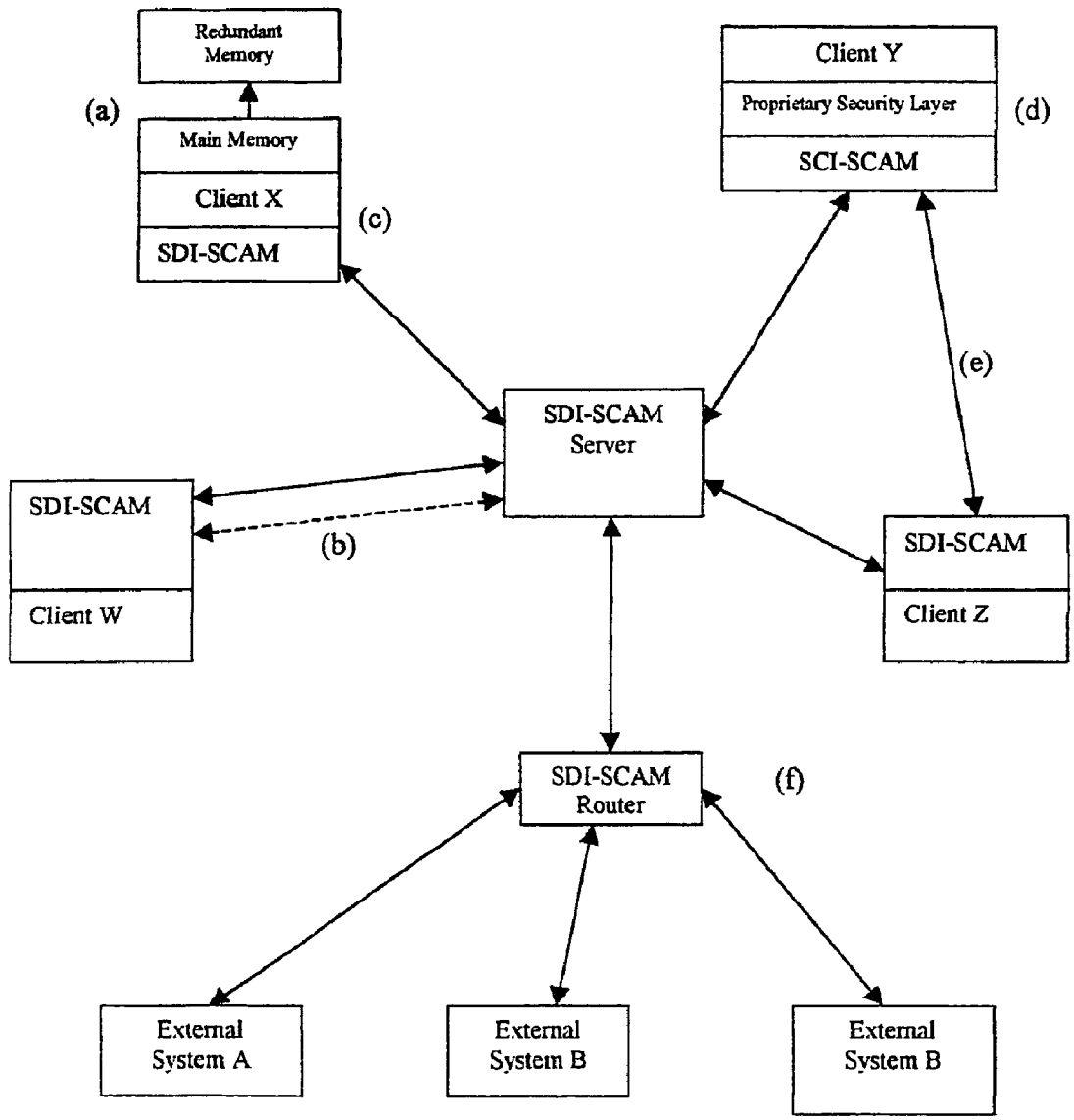

SYSTEM AND METHOD FOR A DISTRIBUTED APPLICATION AND NETWORK SECURITY SYSTEM (SDI-SCAM)

CROSS-REFERENCE TO RELATED APPLICATIONS

The present application is a Continuation-in-Part of application Ser. No. 10/693,148, filed Oct. 23, 2003 now abandoned, and application Ser. No. 10/693,148 is incorporated herein by reference. This patent application also claims benefit of Provisional Application 60/436,363, filed Dec. 24, 2002.

BACKGROUND OF THE INVENTION (1) Field of the Invention

The invention related to the field of security systems for computer networks.

(2) Description of Related Art

Computer networks today are as vulnerable as ever from unauthorized intrusions by external entities. The increased complexity and variety of computer systems in operation means that an even wider array of intrusive strategies is possible, in turn requiring ever more sophisticated protective mechanisms.

Although simultaneous attacks are often launched against entire networks, most existing security systems are focused at the level of the individual machine—ports are monitored for suspicious activity, incoming files are scanned for viruses, and user accounts are protected from unauthorized access. Network-level security is much harder to control—and it may take time for coordinated threats to be detected and counteracted. For example, a virus may have several days to spread and attack individual machines before public awareness of the threat emerges, and even then it may take several more days for security experts to create and disseminate a countermeasure. In the first few days of such an attack individual system operators may not realize that their systems' problems are not simply localized disturbances, but rather a network-level problem, and it is during this window of time that much of the damage is done both directly and indirectly by replication and propagation across the network(s).

BRIEF SUMMARY OF THE INVENTION

An architecture is provided for a widely distributed security system (SDI-SCAM) that protects computers at individual client locations, but which constantly pools and analyzes information gathered from machines across a network in order to quickly detect patterns consistent with intrusion or attack, singular or coordinated. When a novel method of attack has been detected, the system distributes warnings and potential countermeasures to each individual machine on the network. In a preferred implementation, such a warning may potentially consist of a probability distribution of the likelihood of an intrusion or attack as well as the relative probabilistic likelihood that such potential intrusion possesses certain characteristics or typologies or even strategic objectives in order to best recommend and/or distribute to each machine the most befitting countermeasure(s) given all presently known particular data and associated predicted probabilistic information regarding the prospective intrusion or attack. If any systems are adversely affected, methods for repairing the damage are shared and redistributed throughout the network. The net impact of SDI-SCAM is that every machine on a network can benefit from security experience gained at any other point on the network. A high and uniform level of security is therefore assured to all systems attached to the network, and this security is updated in real-time.

BRIEF DESCRIPTION OF THE DRAWINGS

The FIGURE demonstrates some of the architectural features discussed, including (a) redundant memory within a given machine, (b) redundant connections between clients and servers, (c) SDI-SCAM installed as a primary security system, (d) SDI-SCAM piggybacking on an existing security system, (e) direct client-to-client agent communications, (f) on a router.

DETAILED DESCRIPTION OF THE INVENTION

The basic architectural approach for SDI-SCAM is that each node of a computer network is loaded with an agent capable both of ensuring security at the locality of the machine on which it is installed, and of communicating with other SDI-SCAM agents across the network. Because agent configurations are highly flexible, SDI-SCAM implementations can vary widely, running the spectrum from fully centralized (in which SDI-SCAM agents on client machines communicate uniquely with a centralized server dedicated to processing security-related information) to fully distributed (in which each client agent is given the ability to process security information locally, and information is shared on a peer-to-peer basis).

Basic Network Elements

The preexisting elements of this network security system are the machines themselves. It is assumed that these systems, which act as the nodes of a network, consist of heterogeneous pieces of hardware running different sorts of operating systems. It may well be the case that various security layers will already be in place.

Additional Hardware

In preparation for the installation of SDI-SCAM across a network, it will often be desirable to upgrade existing machines with redundant hardware.

In a preferred embodiment, preexisting systems will be supplemented with redundant memory systems that persistently mirror the contents of the primary memory banks. When a computer's primary memory is corrupted (as can happen during a viral attack), it can be completed, cleared and reset with a pre-corruption image from the backup.

A further redundancy can be built into the network connections that link the local nodes to SDI-SCAM servers. For example, a computer that normally operates through land-based optic lines may be given an additional wireless connection through a satellite system.

An expensive, but preferred, architecture is to connect each SDI-SCAM agent through a fully isolated network that operates independently from the network on which the protected system resides. Thus, the SDI-SCAM agent will remain in contact with the security network even when the system it is supporting is under a sustained or unusually intense attack.

SDI-SCAM Agents

An agent is an entity that can be loaded onto any node(s) of a network, and which in this case is assigned responsibilities related to system security. Note that the construction of a given agent can vary widely, as it can be implemented through software, through hardware, through human interaction, or some combination thereof. In a preferred embodiment of SDI-SCAM, every machine linked into the system is loaded with an SDI-SCAM agent. Agent responsibilities include the following:

1) The collection of traffic data—among other things, each agent observes the packets being routed through its local system, observes every file transmission, monitors every user action, and logs every request for access.

2) The ability to communicate with other SDI-SCAM agents—each agent has the ability to communicate and exchange information with other agents (although the content of this information and the agents with which it is shared may be controlled, as will be discussed later). In normal use, a remote agent will send filtered traffic information downstream. When other agents detect potential security threats, warnings will pass upstream back to the remote agent.

3) The maintenance of various protections—On a continual basis, SDI-SCAM agents send and receive warnings and potential countermeasures relevant to whatever network risks are the most likely at a given time. For example, if a computer virus is detected at one node on the network, the local agent will immediately communicate a warning to all other agents in its contact neighborhood. If an attack is especially bad, the agent will have the ability to swap into the backup memory or contact other agents through alternative communications lines.

SDI-SCAM can operate either as a standalone security system, or as an additional layer that subsumes (and takes priority over, in cases of conflict) existing security protocols.

4) The ability to repair damage—Even after a node is known to have been attacked, the SDI-SCAM agent can be given access privileges such that it can aid the system administrator in controlling and repairing whatever damage has resulted.

5) The ability to scan collected data traffic for patterns consistent with threats—In many configurations, SDI-SCAM agents share their traffic information with a dedicated SDI-SCAM server capable of gathering and sifting through the entirety of the traffic data in order to detect patterns consistent with a network attack, be it related to a hacker or to a new virus. Certain traffic events, which individually may be mistaken as simple anomalies, may become more apparent when the totality of a network's (or multiple networks) traffic is considered on a macro scale.

6) Notifying system administrators in the event of certain probabilistic attributes exceeding certain levels—The system's implementation of a Belief network (as herein disclosed) may also be used to determine under what overall conditions of probabilistically determined and descriptive variables it is advantageous to notify the system administrator. These variables can be based upon the predicted likelihood for the system to solve the problem, prevent certain types of problems, undesirable events and/or quantified degrees thereof from occurring or manual/or manually adaptive rules may prescribe threshold settings for some or all of these key variables. Among other situations, the system administrator may be notified or alerted in cases in which patterns detected may be only slightly suspicious according to the standard screening methodology, however, are consistent with SDI-Scam's best estimated simulation model from its distributed agent sources of how a threat might emerge, e.g., by mutation and re-emergence, e.g., after initially being defeated by SDI-Scam.

Meta-data associated with the accessor like a watermark that can also be embedded in code that contains digital credentials of the user, however, incorporates the use of "potentially" rogue, irresponsible, or destructive individuals as per the types of associated predictive attributes from criteria as disclosed in a presently preferred embodiment. The code cannot be tampered with out interrupting the watermark. A more general term for this "invisible" code sequence, which appears random to a would-be interceptor, is "embedded code". Typically, the embedding is done in a much larger nonsense message to apparently random patterns (in as much as the application code would already be encrypted) and this nonsense message content may not be required. Also, it can be associated with functionally defined portions of the code, which pre-approve certain behaviors. The system could also be based upon willingness of the accessor and/or code which s/he writes to statistically pseudonymize and profile the user with that of the patterns/types, etc. of code s/he has written in the past, thus predicting even without explicit identification who is the likely author and what s/he is like, i.e., what is the statistical probability distribution of the individual to each of a variety of previously known identities based upon code morphological characteristics, functional behavioral features, human behavioral features (e.g., if it is accompanied by a human attack). Pseudonyms and resolution credentials may be useful to authenticate the basic intent and MO of the author of the code while use of cryptographically interoperable pseudonyms, i.e., multiple unique but single identity aliases which are linkable to that single author only by SDI-SCAM for its security analytical purposes and under prescribed conditions (as data disclosure policies) as dictated by that author. Pseudonyms may be used to insure the same level of anonymity of the author as uncredentialed code. This approach could, of course, either be implemented as a local protocol (i.e., existing applications, application updates and new applications could all possess these credentials verifying/certifying that the present code was written by an individual who has been certified by a trusted certification authority as being non-malicious). This approach and the above pseudonym based identity protection scheme, while applied in this case to the application of software security are disclosed in detail for the application of identity protection, data privacy and security from rogue individuals interacting on communication networks such as the Internet. These relevantly related techniques are well described in the parent case as well as in U.S. Pat. No. 5,754,938, entitled "Pseudonymous Server for System for Customized Electronic Identification of Desirable Objects".

Within a typical context, this type of code certification should be impervious to a "man in the middle" attack. Such embedded messages (or in a similar cryptographic variation, "fingerprinting") are inherently effective for the security application proposed inasmuch as any rogue code which a system attacker would attempt to insert into a certified application or communication or other communication containing executable code would contain within its sequences continuous portions which do not contain the embedded credential-based sequences. Likewise, in case the would-be man in the middle attempted to remove certain data, (e.g., credentials or functional application code) the fingerprinting technique would recognize the specific extracted code segments. This exact same problem can be solved alternatively another way in which the primary objective is to transmit data containing a message the existence of which is not possible to be detected by a would be "man in the middle" attacker. In the example approach in which a content bearing message is embedded or fingerprinted into the application code (or less desirably in an associated larger message), the message can only be identified by the recipient (the local SDI-SCAM agent) who may also be similarly hidden or "steganographed" as with the originally sent message (in order to verify receipt of the message by the authenticated recipient. There may exist in this content bearing message a variety of useful credentials incorporated therein including but not limited to credentials approving both authenticity, untampered state and authentication of the sender and/or author as well as proof of certified "good intent" on the part of the code author. The technique for insuring that the embedded sequences are completely undetectable, while at the same time being diffusely spread throughout the code is typically performed by using encryption techniques (e.g., pseudo-random sequences) to determine the positions of the sequence bits within the remaining code in order to thus pass a message to the recipient (the local SDI-SCAM agent) containing the credentials and potentially the message of the coordinates of the associated meaningful sequences, such that all of these content bearing sequences appear among the remaining code as random noise, including the portion of the message containing the encrypted coordinate data of which coordinate bits possessing the totality of the embedded or fingerprinted message can be found within the application. Alternatively, this message containing the coordinate locations of where to find the meaningful bits containing the content bearing message may be embedded within a larger message which itself appears to consist entirely of noise (which in and of itself lends the security of the embedded or fingerprinted message contained therein). The primary hurdle in this case is to enable the recipient to be privy to certain data, which is not known to a would-be "man in the middle" attacker namely where to look for the message, i.e., the coordinates of the meaningful data constructing the message. This "shared secret" between the sender and the receiver could be conveyed to each party initially by a (one time) physical distribution (e.g., contained within an application if it is physically distributed, such as on a disk, or visa vie the OS or CPU, etc. In one variation in which the dissemination of this message needs to be performed on a network wide level (or group level), the shared secrets may be physically distributed, once to all parties in a group and, subsequently, all parties would be able to instantly initiate communications with the security guarantees achievable through the presently proposed methodology.

Finally, it will be sufficiently obvious to one skilled in the art that the presently proposed methodology has numerous potential applications in cryptography and data security and thus the means for distributing data coordinates to a recipient of a steganographed message for conveying (and if desired reciprocally confirming) a message is in no way limited to messages, containing credentials and authentication certificates about an author and/or sender. For example, the present technique could be very prudently employed as a means to distribute and replenish shared set keys within the context of the co-pending application U.S. patent application Ser. No. 10/418,983, filed Apr. 18, 2003. It may also protect against man in the middle attacks against distribution of private keys in Pki protocols.

SDI-SCAM Network

There are multiple network morphologies possible. Major configurations include the following:

1) Local network: SDI-SCAM enabled machines may form a local network, such as a LAN or WAN. Gateways to external networks (such as the Internet) can be fully controlled through SDI-SCAM enabled routers.

2) Open network: On the other hand, SDI-SCAM enabled machines can be connected directly to outside systems (such as a desktop system connecting through a generic ISP), but which maintain communications with a chosen neighborhood of other SDI-SCAM enabled machines.

3) Centrally organized networks—In this configuration, thinner SDI-SCAM agents are placed on individual nodes; these agents continue to be responsible for direct security and repair, but transmit gathered traffic information to central SDI-SCAM servers containing dedicated hardware and software capable of swift and very in-depth analysis of the gathered information.

4) Distributed networks: In this configuration, each SDI-SCAM agent shares the responsibility for traffic data analysis and the generation of preventative measures with other agents. A peer-to-peer morphology would work well in this case.

Inter-Agent Communications

Although there is clearly a benefit for agents to fully pool all information, it may be desirable to control both the content shared and the partners with which a particular agent is allowed to interact. These parameters can be set at the local level according to users' preferences.

SDI-SCAM agents may in fact negotiate with each other depending on the value and sensitivity of particular information, as well as the value of any likely synergies between them. Multiple agents may meet in virtual information sharing marketplaces.

Another level of security can be gained through the exchange of obfuscated, but still valuable, information. Such randomized aggregates would allow systems to share fundamentals without revealing details of their particular data (for example, agents could share times of attempted log-ins without revealing the associated user ids and failed passwords).

In more complex realizations of this system, associated groups of agents may form coalitions, with information shared freely internally, but shared with conditions externally.

A further feature is that communications between agents need not be perfectly symmetric—in other words, different agents may send and receive different sorts of information. This might apply, for example, to a centrally organized SDI-SCAM network: outlying agents would have no need to transmit detailed traffic data to each other, but would rather transmit it directly to a central server. The central server might communicate with other central servers, in which case it would transmit high-level information relevant to the processing of the entirety of the traffic data; on the other hand, when communicating with outlying nodes, the central server might only transmit simple virus protection instructions and metrics which are substantially devoid of any data which suggests what types of information, attacker strategies or applications are running on other nodes on the system which are outside of the network of nodes and which are currently trusted by the nodes from which the centrally collected and processed data had been acquired.

Furthermore, there may be an additional or alternative approach to guaranteeing absolute data security at a local network or machine level while enabling maximal or complete harnessing of all of the statistical knowledge, which is present across the entirety of the network. In this approach it may be possible to operate SDI-SCAM or certain particularly sensitive portions of it with its multiple agent architecture as a singular trusted, yet distributed multi-agent system. In this variation, all of the locally performed or assigned agent functions are assumed to contain sensitive data belonging to external third parties and thus all processing activities, data communications with other agents or the central SDI-SCAM server occurs within a secure trusted and untamperable environment such that the only knowledge ultimately accessible by any given agents, associated local server or network on which it physically resides may be the collection of executed functions which are performed by the local agent on behalf of the SDI-SCAM to protect the local system as herein disclosed.

The order and way in which agents communicate with each other may be highly conditioned on the particular nature of a given system. Criteria include (but are not limited to) the following:

overall vulnerability of a system;

importance of the system to the integrity or functioning of a network;

sensitivity and value of the data stored on a system;

probability that the system has already been compromised or damaged;

characteristics of the network traffic going to and coming from the system;

overall importance of a system to a potential or identified hacker or specific system subcomponent.

This may dynamically change from moment to moment and is predicated by a probabilistic estimate determination variable of the intruder, whether autonomous or human and/or by human expert based estimates who are ideally familiar with local competition (or enemies) and broad knowledge of what types of knowledge on the system would be most of interest to which other entities or individuals and for what reason. If an individual is specifically identified this statistical model may further borrow and integrate techniques disclosed in co-pending U.S. patent application Ser. No. 10/202,302, filed Jul. 24, 2002.

Updates and communications between agents (termed "polling") may be based on schedules or on circumstances. For example, a remote agent may be updated with new anti-viral software once a month; however, if any other node on the network is attacked, the schedule is suspended and an immediate update is performed. Certainly even if an attack which, for example, has only begun to occur or which has not even positively been confirmed as yet, triggers SDI-SCAM's system alert feature, other nodes on the network most preferentially/urgently those which are physically proximal or in other ways similar may also be put on alert status and SDI-SCAM's repertoire of protective features may be triggered so as to begin operating at a heightened level of defensive activity. As indicated, there may be a range of different system defense levels corresponding to a decreased probabilistic likelihood of a threat and the likely severity thereof should this threat exist. Local system administrators are notified appropriately as well. Determining the likelihood that a threat upon a particular node or network will also be carried out against any other given node can be predicted by such variables as commonalities at an organizational or strategic level, data communication occurring there between, commonalities in the existing or perceived data on applications contained or functional objectives achieved upon that node, presume interest level that a potential intruder of the attacked node or network may also have with the other node, etc.

Polling priority may be based on calculated likelihoods: for example, if various factors indicate that the probability is high that a remote node has been infected by a particular type of virus, the central server may be put into immediate communication. Polling priority will also depend on the nature of the nodes and the way in which their agents have been seen to communicate. U.S. Pat. No. 5,754,939, entitled "System for Generation of User Profiles for a System for Customized Electronic Identification of Desirables Objects" may be used as the basis for optimizing the way in which polling is performed.

Illustration

FIG. 1 provides an illustration of some of the configurations discussed here.

Analytics

Given the number of different security objectives, as well as the number and diversity of possible agents and network configurations, a fairly broad range of analytical tools are employed by SDI-SCAM. They include, but are not limited to, the following major categories of analysis:

Methods to Detect and Classify Direct Intrusions

Direct intrusions are attempts by unauthorized entities to enter a particular system, either over a network or through local terminals. These can range from fairly unsophisticated attacks (for example, teenage "script kiddies" using standard public domain software to scan for open ports across a list of target IP addresses), to extremely skillful attacks that are focused on a very particular target (as might happen during corporate espionage).

Since SDI-SCAM agents are able to dynamically monitor and analyze as well as control all in-going and out-going traffic, they are in a good position to detect and counteract such attacks.

1) Attack Patterns Consistent with Previously-Observed Patterns Across the SDI-SCAM Distributed System.

Each SDI-SCAM agent has access to a shared database that contains the signature patterns of previously observed (as well as verified) attacks. The likelihood of these events having been actual attacks may be probabilistically estimated so as to optimize the precision of SDI-SCAM detection/diagnosis as well as countermeasure deployment system modules. Such patterns might include the use of a particular password list, log-ins at particular time intervals or frequencies or times, log-ins from suspect IPs, (and/or combinations thereof) constitute a few of the straightforward examples.

If such a pattern is detected, the resident SDI-SCAM agent may opt to deny all entry to the IP of the incoming log attempts, or it may opt for a more sophisticated defense, such as opening a "honey pot" trap, a virtual space that simulates the environment of the system that is being protected. The hacker, believing that he has actually broken into the system, can then be monitored by SDI-SCAM, as his behavior might gives clues to his location, identity, and motives and incriminatory evidence, if desired. Assuming the hacker has learned (or possesses) enough knowledge about the system to detect "honey pot" traps it is advantageous and precocious to possess at least equivalent knowledge regarding SDI-SCAM to possess at least equivalent knowledge regarding its own environment and to be able to enable the system administrator access to that knowledge as well as (via SDI-SCAM) knowledge known or suspected to exist within a probabilistic context regarding the hacker or threat and its strategy and/or this knowledge may be acted upon appropriately by SDI-SCAM in automatic mode. Invariably all counter measures (such as honey pot traps) used by SDI-SCAM can be used to the advantage of the hacker if s/he is aware of the strategy of SDI-SCAM to monitor, model, locate in order to ultimately catch him/her.

2) Utilizing Data Modeling to Adaptively Learn and Recommend Appropriate Countermeasures Implementation of practically viable automated countermeasure scrutinization and recommendation scheme is quite achievable:

a. If the conditions/parameter triggers are simple and unambiguous, and b. If the system administrator is notified and able to intervene while exploiting the system's analytical knowledge and system-generated recommendations and scrutinies by the system on behalf of his/her chosen response decision.

In the ideal scenario, because rogue attacks are capable of performing increasingly effectively against system security protections (in addition to being more sophisticated and expeditious) and especially with regards to leveraging the system's own abundantly capable resources, it may be ideal as a complementary measure to building redundancy into the system resources in the interest of expediency of decrypting a counter measure, to also immediately respond in automatic mode, then solicit the active, albeit system-guided intervention of the system administrator whereby more significant decisions can be perhaps more confidently and prudently executed (e.g., whether or not to delete potentially corrupted files/portions of system data at the server or network level), whether to guarantee a certain portion of the network but allow certain essential functions to continue for the time being without code exchange, whether or not to attempt to infect the hacker's machine (or analysis code into the virus itself) which may provide additional detailed information as well, etc.

3) Novel Attacks

In some cases, attacks will follow completely new or novel patterns.

Such attacks can be detected in different ways. One solution is to configure a Bayesian network to constantly gauge the probability of an ongoing attack by monitoring network traffic activity (this configuration can be done by human experts and/or through machine learning techniques). A variety of factors can be extracted from the network traffic across all SDI-SCAM agents in the local network—for example, the number of failed log-ins, the identities and IP addresses of those users attempting to log in, the importance, sensitivity or "value" (more specifically "perceived value") of particular target files or contents potential adversarial entity or prospective hacker, etc. These factors are fed into ongoing probability calculations, which may trigger a system-wide warning if a certain threshold is surpassed.

Keystroke monitoring virus must be mentioned since it is impervious to NORTON™, etc.

For example, suppose a ring of corporate spies tries to hit a company's network simultaneously. SDI-SCAM agents across the network will report the use of unauthorized passwords originating from the same IP or IPs to which associations have been constructed via SDI-SCAM based upon historical statistics if the probabilistic likelihood of such events occurring independently might be so unlikely that the Bayesian network would immediately increase its estimate of an ongoing attack.

4) Attack Warnings

Note that in all cases, when an attack is suspected the resident SDI-SCAM agent will immediately alert all the other SDI-SCAM agents in its network neighborhood, sharing all traffic information relevant to the on-going security issue. Such warnings will include information related to the particular nature of the problem, in particular the probability and nature of the threat (for example, communication with an unsecure system, access by an authorized user, reception of potentially infected files, etc.).

When an on-going attack is announced, SDI-SCAM agents receiving this information may opt to increase the security levels of their own systems. For example, users may be required to telephone at the time of their log-in to verify location (through caller ID) and voiceprint.

Methods to Detect and Classify Viruses or "Trojan Horses"

Origins, possible paths of transmission across sites, etc. types of files (e.g., particularly vulnerable or vulnerable origin site), may be analyzed to provide ideas as to how to use this data to make a vulnerable application, Trojan horse attempt impervious, make rogueness, crypto query, even rewrite code.

Another vector of attack is through viruses (which are often unauthorized and malicious programs attached to files, email, or documents) and trojan horses (seemingly innocuous programs that contain hidden programming capable of causing damage).

Code Analysis

The conventional viral detection methodology is to scan the code (in the case of executable modules) and macros (in the case of smart documents, such as those generated by Microsoft WORD™) for patterns that have previously been associated with viruses or malicious programming.

SDI-SCAM maintains up-to-date records of all known viruses and checks all incoming files (and periodically, all stored files) against these records. A match indicates that a file is potentially infected—the user is alerted of the danger and automatic defensive measures may be set into motion.

Behavioral Analysis

SDI-SCAM monitors all processes for behavior consistent with viral infection. For example, a program that is observed to open and modify a wide range of heterogeneous files, which accesses the mail system's address folder, which aggressively propagates copies of itself, which engages in recursively redundant actions whose objective is designed to achieve no useful purposes or frequently which aggressively/repetitively generates or obtains data files in order to propagate inordinately voluminous and/or large files (possibly including itself) resulting in bursts of traffic (thus overloading valuable network transmission capacity), which performs similar recursively redundant actions resulting in consumption and overloading of valuable processing capacity, which modifies or mutates its own code (and/or behavior), or which opens unexpected communication ports with outside entities will be flagged as a potential threat. Unquestionably, SDI-SCAM's highly distributed data traffic monitoring and behavior and code analysis facilities as a combined approach give it a marked and compelling advantage in rapidly analyzing those behavioral patterns and characteristics most commonly associated with a rogue code such as viruses, Trojan horses, worms, etc. whose tell tale signs could not be identified nearly as expeditiously as that of SDI-SCAM's distributed agent monitoring architecture. Such commonly occurring signatures which SDI-SCAM's distributed Bayesian methodology is particularly well suited includes those patterns of self replication and dissemination through address books, email, web browsing sessions, etc., as well as the co-occurrence of identical or related patterns of behavior and code sequences in conjunction with these replicating and self propagating patterns as observed only on a network level. Certainly part of this behavioral analysis may encompass attempts by SDI-SCAM to classify the identity or type of virus based upon all of the above observed characteristics as well as attempting to extrapolate its high level objectives and associated executable rule sets based upon its behavioral patterns associated with the conditions/variables of the environment which it has encountered, the data which it has likely accessed, the actions, events and countermeasures to which it has been exposed, the code within which it has likely been embedded, etc.

Although it may be difficult to delineate rogue from innocuous code it is certainly within the scope of capabilities of SDI-SCAM to utilize all of the available data, both behavioral and code sequences, in order to attempt to reverse engineer the code for the purposes of both predicting its future behavior, likely past behavior and high level objectives. For example, SDI-SCAM could replicate the code inside of an environment which is quarantined from the network, but which is a replica of the network or a portion thereof. SCI-SCAM could then monitor how the code behaves in this simulated environment to the actual one as well as observing its response to targeted stimuli, which may, for example, provide opportune conditions for the most likely rogue actions to be performed. This analytical procedure may be performed in response to a predicting statistical model (designed to predict the code's behavior) when a decision tree could be used to dynamically select the set of functions to be executed which based upon the same model are correlated and then predicted to elucidate responses on which are the most optimally revealing, reveal the most revealing which is needed to complete the construction of this data model for the codes for being able to predict the code's behavior across a wide array of conditions, actions, software and data to which it may ultimately become exposed within the entirety of network(s). In depth analysis of potentially suspicious code although challenging as it may be could potentially provide system level insights into how to best respond to the potential threat and if mandatory the nature and aggressiveness of countermeasures to be taken or recommended to the appropriate human system security counterpart.

The user will be alerted, and if he confirms that the program is operating outside of expected parameters, or if the user does not recognize the program, it is taken offline until it can be examined in detail by an expert.

Dead-Ringer Analysis

Although not currently a threat, it is likely that infectious programs will be able to simulate the behavior of human users. A suite of behavioral response tests can be developed to detect and counteract such entities, e.g., a probabilistic model based upon other previous threats in the statistically similar characteristics (including behavioral characteristics and certainly those determined to be the most likely to be the same). Queries which may be required of the "user" to be answered correctly or to perform a task (e.g., compose a block of text on the basis of a query) in order to proceed could be solicited of the user which are crafted such that an emulating virus would likely fail such query procedure. Moreover, Natural Language Processing methods can be used to analyze outgoing text for irregularities consistent with a non-human origin. It is possible that in a similar fashion, that, in theory very smart emulations of existing code could be manually or even automatically on the fly created which emulates in many respects existing "good code", but which actually is designed for malicious objectives or, for example to take over control of the good code or replace it with the rogue version. As additional attributes of the system, the system may determine probability and degree of ill motive of individuals of most likely suspicion (if such suspicion is high enough to be of reasonable concern). Typically, common suspicion of particular individuals can be linked to unscrupulous employees (present or former), disgruntled employees, disgruntled spouses of key persons/owners (e.g., changing files, information release, etc.) to embarrass or defame the person or to feign a verbal or tactical attack on a friend, associate or colleague. Such "suspects" could also include trusted partners who may be confided with knowledge of the existence of unique information which could be of interest directly or could even help or strengthen that party in its business position with its "trusted" business partner.

Control of Triggers

If the probability of an infection is deemed to be high, SDI-SCAM may control the generation of events that could potentially trigger the reaction of a resident virus. For example, if a bank suspects that a corporate virus has infected the system, all transactions may be suspended until the virus is cleared. Otherwise, the action of a user requesting an on-line transaction (thereby releasing his personal password to the system) may trigger the virus into capturing and re-transmitting his personal information.

Tracing Threats Back to their Original Source

In traditional system security techniques this objective is highly desirable and yet extremely difficult. Nonetheless, SDI-SCAM's functional features lend themselves quite well to the design of certain particular types of applications, which can be useful in addressing this particular problem. For example, the following example applications may be herein considered:

1. "Infecting" the hacker's machine (or the virus) with a virus, which logs and/or conveys back to the SDI-SCAM agent the location, behavior, files infected as well as all IP addresses of the machines in which these files reside. This approach is likely to work provided that the implanted virus by SDI-SCAM is not recognized by standard virus scanning software or other IDS systems and assuming that the receiving machine is not programmed to block any outgoing messages. Thus, the success would be determined in part by the effectiveness of the virus to take control of the adversary's (or rogue virus containing) machine. This type of direct analysis will both enable preemptive alerts of exactly where the virus may be spreading to other machines and/or networks as well as provide valuable statistically confident data as to the function, behavior, data or code affinities and behavior in response to infection of the same as well as epidemiological characteristics which could be extremely valuable as to anticipatory determination and qualification of the associated threat on other machines, as well as the most appropriate countermeasure each local agent should implement or receive in response. Certainly, this approach could be useful for viruses, which possess particular rapidly proliferating characteristics, rapid infliction of destructive behavior. For example, one could imagine the behavior of more sophisticated viruses which might proliferate themselves as redundant messages so as to rapidly overwhelm network capacity and/or memory processing and/or implement parallel strategies.

This approach could also enable SDI-SCAM to model not only future epidemiological characteristics of rogue software but also that of post epidemiological behavior (which machines or networks were likely to have been infective previously based upon presently known epidemiological characteristics) and the devices/networks which are known to be and probabilistically suspected of being infected by the same virus (or mutated variant thereof). Certainly reconstruction past, present and future behavior in this regard could be relatively easy to perform for worms that may require access to ISP server logs for other variations which may use email and web server connections as a medium of transmission. A protocol also may allow for the existence of a latent tracking virus to reside within all machines which can be, in the case of significant probability of a threat in and among a network community or otherwise "group" an excessive probability of a threat, the tracking virus may be remotely activated by a multi-casted activation message originating form a core (or root) server.

2. Use of SDI-SCAM Architecture for Application Level Security

It will be increasingly important in the future for many of the functions of SDI-SCAM as implemented within the context of its presently disclosed distributed statistical analytics to be implemented not only at the level of a distributed network security system but also at the individual application level. That is to say that SDI-SCAM agents could, in addition to the above described system level implementations, also implement their various functions for data collection, analysis, and countermeasures at the application level as well both to implement other application level security protocols as well as incorporate into the statistical analytical scheme probabilistic attributes regarding the behavior functions, etc., of such rogue code within the context of the particular relevant applications in need of protection, albeit using the same distributed adaptive modeling and countermeasure response protocols described herein in comprehensive fashion.

Methods to Detect Tampered Files (Semantics and Content)

It is sometimes the case that intruders, rather than destroying or removing files, will simply alter them in potentially malicious ways. For example, students may attempt to hack into their school system in order to change grades, or a more advanced hacker may attempt to break into a bank to fraudulently increase the balance in his account, into tax or criminal record databases in order to change tax liabilities, records of property ownership or criminal records, into professional board's databases in order to change licensure status. Similar tampering may occur to files whose contents may relate to the hacker (e.g., employee files of present or past employers). Malicious code may, in theory, perform all of the functions that a human may perform, perhaps, however, potentially even more unobtrusively and elusively in that it may be more difficult to trace and flag than a human if the code is very small, robust and capable of focused but sophisticated emulations of legitimate applications and users.

In addition to the above suggested techniques for use in tampering detection and ultimately prevention (or even tracing the origins of tampering attempts), there are other straightforward IDS-based approaches by which such attempts could be countered (and could even complement the above safeguarding scheme, for example, in terms of being a default detection scheme and/or in corroboration of the presumed integrity of credentialed individuals). Thus, the following IDS-based alternative technical approach is also provided as well. The local SDI-SCAM agent maintains logs that detail the general characteristics (size, word count, hash code) of all documents on the system. The time and circumstances of any changes are cross-checked against average traffic patterns for that particular system. Hence, school records altered at 3 am (in a district where all school secretaries worked strictly from 9 am to 5 pm) may be flagged as potential objects of tampering.

Tampered files will sometimes show a marked change in writing style or technique. Natural Language Programming (NLP) techniques may be used to detect such changes. Certainly in the event of these suspicious activities and other conditions, it may be advantageous to retain not only the associated statistical data (as the SDI-SCAM does automatically) but also details regarding the events. This could, for example, be later analyzed by humans to compare with other similar suspicious patterns also captured in detail in order to attempt to identify patterns, more subjective signatures, or hall marks which may not be able to be performed automatically (such data may also be useful for potential legal evidence).

Methods to Detect and Classify Untruthful Commercial Messages

Untruthful messages represent a more traditional kind of deception—the technology of the delivery is not damaging, rather, the content of the message itself is untruthful and may prove harmful if taken at face value by the receiver. A good example of this is the "Nigerian Scam," a widely disseminated email that purports to be authentic, asking the receiver to give the sender access to an American bank account in exchange for great financial reward. The result, of course, is that the receiver ends up being defrauded of large amounts of money.

1) Cross-Checking Content Against Known Hoax Documents

SDI-SCAM maintains a database of questionable messages and uses natural language programming-based techniques to compare incoming messages with previously logged deceptions. Thus, when a suspicious message is detected, the receiver may be sent a secure attachment by SDI-SCAM with an email stating that there is a high probability that the mail is untruthful, and indicating pointers to web pages that discuss that particular deception. If a user is nonetheless deceived by such a message, the local SDI-SCAM agent may be alerted. It will transmit the text of the novel message to a security database, allowing every other SDI-SCAM in that network neighborhood to be aware of the danger. In such a case, the agents may retroactively warn users by scanning old emails and alerting receivers of possible deception.

Certainly in such an event, autonomously implemented counter measures may also be performed if appropriate as a defensive or evasive action or deterrent, e.g., if a pass code was inadvertently sent out (and it was not blocked by the system) the pass code could be automatically changed or temporarily frozen or if a personal bank account or credit card number were sent out in a suspected inappropriate context (again assuming it was not blocked at the source by the system), the account could be automatically temporarily frozen and the number changed or (for example) the account automatically set up as a honey pot trap to acquire just enough information about who the suspect entity is in order to catch him in an inappropriate act of fraud or deception.

2) Predicting Possible Hoax in Novel Message

In cases where a message is not closely correlated with known hoaxes, it is still possible to analyze (using natural language processing techniques that are currently well known to the art) the content of the message and flag any suspicious content:

the content of the message can be cross-checked against recent news stories discussing hoaxes; and.

the names and return email addresses of the incoming mail may be checked against those of known hoaxsters.

Automated semantic analysis of the message may be performed for language consistent with persuasion or appeal to greed (or other weaknesses). This analysis is performed on the basis of adaptive rules which may be updated with feedback.

The identity and personal profile of the receiver may be correlated with the characteristics of known victim groups. For example, messages sent to rich elderly individuals may be given additional scrutiny.

The purported identity of the sender can be checked against the path of the email. For example, a message claiming to be from the IRS should trace back to an official government system.

A probabilistic assessment of the likelihood that the sender is fraudulent may be performed through a modified version of the system described in co-pending U.S. patent application Ser. No. 10/202,302 in which the system's probabilistic determination of predictive attributes relevant to an association with fraudulent, unscrupulous or disruptive behavior (in an on-line context) is performed—of course, the sender if self identified may also be fraudulent. The on-line sender just prior to the first receiving node on the system may also be analyzed which is a reasonably reliable tracking means if SDI-SCAM is a ubiquitous protocol (e.g., for patterns of being the origination node for previous problematic messages and/or the techniques disclosed in the same co-pending patent application), whereby the system may probabilistically predict the suspicion level of an individual(s) or organization(s) associated with that sender as being linked to other scams and/or other illegitimate or questionable activities. Related techniques may use other advanced customized semantic analysis and/or adaptive rule based/statistical techniques (preferably in combination) in order to estimate the degree of potential harmfulness of the content.

The content may be corroborated with the content of known and trusted documents, e.g., through the use of content matching techniques. More elaborate extensions of this approach may include more advanced semantic analyses of the subject content with its credible and updated/current matching counterparts whose algorithms are custom configured to confirm (or alternatively flag) or assess the probabilistically estimated "truthfulness" of contents (where "truthfulness" may be reassured according to "confirmed with credible source" as well as scalar measures of degree of likelihood of untruthfulness if the source is unconfirmed or, for example, exhibits semantically suspicious inconsistencies with itself, with credible sources or other patterns which are consistent with fraudulent or deceptive material).

The system may also detect suspicious content, for example, if its appearance co-occurs in the same message with rogue code (for example) is co-located (in the same portion of content) as a macrovirus.

Methods to Repair Post-Attack Damage

In some cases, despite the security, a system in an SDI-SCAM network may be damaged by an attack. If the attack is completely novel, a human expert may be called in to fully analyze the situation and develop appropriate repair protocols. These can then be sent to a central SDI-SCAM damage-control database for use in future situations. In this way capturing as much data and statistical information regarding the attack and its historical counterpart is valuable both as analysis data for the human or to enable the system to construct its own optimal repair protocol.

If an attack method is not novel, the local SDI-SCAM system may access this same damage repair database for solutions to the local problem. Among the remedies to damage from an attack: users are alerted, suspicious files are deleted, backup files are loaded, and current memory is completely cleared and reloaded with an image from a pre-attack state.

The invention claimed is:

1. A distributed security system that protects individual computers in a computer network having a plurality of computers, said system comprising individual computers having agents associated therewith that control the associated individual computer, each agent performing the steps of:
   creating statistical models of usage of the associated individual computer in said computer network;
   gathering and analyzing information relating to current usage of the associated individual computer in said computer network;
   determining from said information a pattern of usage of the associated individual computer that is consistent with intrusion or attack of the associated individual computer or the computer network;
   determining a probability of the likelihood of an intrusion or attack from said pattern of usage of the associated individual computer;
   distributing in real-time warnings and potential countermeasures to agents of each of said individual computers in said computer network when the determined probability of the likelihood of an intrusion or attack exceeds a statistical threshold, wherein at least one of said warnings comprises information related to the nature of the intrusion or attack and the determined probability of the likelihood of intrusion or attack based on the statistical models of the associated individual computer; and
   updating said statistical models of the associated individual computer to reflect the current usage of the associated individual computer in said computer network and the likelihood of intrusion or attack;
   wherein each said agent schedules the associated individual computers for different anti-viral software updates based on different levels of probability of an intrusion or attack for each individual computer based on the statistical model for each individual computer and a detected level of probability of an intrusion or attack; and
   wherein each said agent suspends said schedule and immediately provides the anti-viral software update to the associated individual computer when an intrusion or attack of any computer in said computer network is detected or the detected probability of an intrusion or attack is high that the associated individual computer has been infected by a particular type of virus.

2. The system of claim 1, wherein said at least one warning comprises a relative probabilistic likelihood that a detected potential intrusion or attack based on said detected pattern of usage has certain characteristics or strategic objectives and said potential countermeasures comprise a most appropriate countermeasure for one or more most probable intrusions or attacks based on said detected pattern of usage.

3. The system of claim 1, wherein at least one of said agents distributes to said individual computers in said computer network information relating to repairs conducted in response to detected intrusions or attacks.

4. The system of claim 1, wherein each said agent is provided in a security system installed in each of a plurality of individual computers in said computer network.

5. The system of claim 1, wherein each said agent is provided in a system that is provided in addition to a security system installed in each of a plurality of individual computers in said computer network.

6. The system of claim 1, wherein each said agent is provided on a router for providing said information to individual computers or computer networks connected to said router.

7. The system of claim 1, wherein agents associated with individual computers in said computer network communicate said information and said real-time warnings and potential countermeasures in a peer to peer fashion.

8. The system of claim 1, wherein agents associated with individual computers in said computer network communicate said information and said real-time warnings and potential countermeasures to a central server for distribution to agents associated with other individual computers in said computer network.

9. The system of claim 1, wherein individual computers in said computer network each comprise redundant memory systems that persistently mirror the contents of primary memory of each said individual computer.

10. The system of claim 1, wherein said information comprises at least one of traffic data amongst individual computers in said computer network and metadata associated with one or more accessors of said individual computers in said computer network.

11. The system of claim 1, wherein each said agent comprises a virus scanner that checks code of each said individual computer for patterns associated with viruses or malicious programming.

12. The system of claim 1, wherein each said agent distributes shared set keys and parameters for updating said statistical models to each of said individual computers in said computer network.

13. The system of claim 1, wherein each said agent communicates with other individual computers based on characteristics of the computer network that may change from moment to moment based on a probabilistic determination of a threat level of a particular intruder or attack.

14. The system of claim 1, wherein each said agent schedules said different individual computers for different anti-viral software updates based on different levels of probability of an intrusion or attack for each different individual computer.

15. The system of claim 1, wherein each said agent comprises a Bayesian network that constantly gauges a probability of an ongoing attack based on traffic activity in said computer network.

16. The system of claim 1, wherein said warnings comprise information related to a particular nature and probability of a detected intrusion or attack.

17. The system of claim 1, wherein said detected pattern of usage is compared against a security database to determine if said pattern of usage is consistent with a known intrusion or attack.

18. A method of protecting individual computers in a computer network having a plurality of computers, wherein individual computers have associated agents that control said individual computers to perform the steps of:
creating statistical models of usage of said individual computer in said computer network;
gathering and analyzing information relating to current usage of said individual computer in said computer network;
determining from said information a pattern of usage of said individual computer that is consistent with intrusion or attack of the individual computer or the computer network;
determining a probability of the likelihood of an intrusion or attack from said pattern of usage of said individual computer;
distributing in real-time warnings and potential countermeasures to agents of each of said individual computers in said computer network when the determined probability of the likelihood of an intrusion or attack exceeds a statistical threshold, wherein at least one of said warnings comprises information related to the nature of the intrusion or attack and the determined probability of the likelihood of intrusion or attack based on the statistical models of said individual computer;
updating said statistical models of said individual computer to reflect the current usage of said individual computer in said computer network and the likelihood of intrusion or attack;
scheduling the individual computers associated with respective agents for different anti-viral software updates based on different levels of probability of an intrusion or attack for each different individual computer based on the statistical model for the computer to be updated and a detected level of probability of an intrusion or attack; and
suspending said schedule and immediately providing the anti-viral software update to the individual computer associated with an agent when an intrusion or attack of any computer in said computer network is detected or the detected probability of an intrusion or attack is high that the computer associated with the agent has been infected by a particular type of virus.

19. The method of claim 18, wherein said warning comprises a relative probabilistic likelihood that a detected potential intrusion or attack based on said detected pattern of usage has certain characteristics or strategic objectives and said potential countermeasures comprise a most appropriate countermeasure for one or more most probable intrusions or attacks based on said detected pattern of usage.

20. The method of claim 18, wherein at least one of said agents further distributes to said individual computers in said computer network information relating to repairs conducted in response to detected intrusions or attacks.

21. The method of claim 18, wherein said information and said real-time warnings and potential countermeasures are communicated amongst agents of individual computers in said computer network in a peer to peer fashion.

22. The method of claim 18, wherein said information and said real-time warnings and potential countermeasures are communicated from agents of individual computers in said computer network to a central server for distribution to other individual computers in said computer network.

23. The method of claim 18, wherein said information comprises at least one of traffic data amongst individual computers in said computer network and metadata associated with one or more accessors of said individual computers in said computer network.

24. The method of claim 18, wherein each said agent further checks code of each said individual computer for patterns associated with viruses or malicious programming.

25. The method of claim 18, wherein each said agent further distributes shared set keys and parameters for updating said statistical models to each of said individual computers in said computer network.

26. The method of claim 18, further comprising an individual computer communicating with other individual computers based on characteristics of the computer network that may change from moment to moment based on a probabilistic determination of a threat level of a particular intruder or attack.

27. The method of claim 18, wherein each said agent further schedules said different individual computers for different anti-viral software updates based on different levels of probability of an intrusion or attack for each different individual computer.

28. The method of claim 18, wherein said warnings comprise information related to a particular nature and probability of a detected intrusion or attack.

29. The method of claim 18, wherein said detected pattern of usage is compared against a security database by at least one of said agents to determine if said pattern of usage is consistent with a known intrusion or attack.

30. A distributed security system that protects individual computers in a computer network having a plurality of computers, wherein said distributed security system comprises at least one security computer that is fully isolated from said computer network having said individual computers and said at least one security computer includes an agent that controls said at least one security computer to perform the steps of:
creating statistical models of usage of said individual computers in said computer network;
gathering and analyzing information relating to current usage of said individual computers in said computer network;

determining from said information a pattern of usage of said individual computers that is consistent with intrusion or attack of the individual computers or the computer network;

determining a probability of the likelihood of an intrusion or attack from said pattern of usage of said individual computers;

distributing in real-time warnings and potential countermeasures to agents of each of said individual computers in said computer network when the determined probability of the likelihood of an intrusion or attack exceeds a statistical threshold, wherein at least one of said warnings comprises information related to the nature of the intrusion or attack and the determined probability of the likelihood of intrusion or attack based on the statistical models of said individual computers; and updating said statistical models of said individual computers to reflect the current usage of said individual computers in said computer network and the likelihood of intrusion or attack;

wherein said agent controls said at least one security computer to perform the steps of:

scheduling different individual computers for an anti-viral software update based on the statistical models of the individual computers and a detected level of probability of an intrusion or attack of the individual computers; and suspending said schedule and immediately providing the anti-viral software update to at least one individual computer when an intrusion or attack of any computer in said computer network is detected or the detected probability of an intrusion or attack is high that said at least one individual computer has been infected by a particular type of virus.

31. The system of claim 1, each agent further receiving warnings and potential countermeasures from agents of other of said individual computers in said computer network when the determined probability of the likelihood of an intrusion or attack exceeds a statistical threshold, wherein at least one of said warnings comprises information related to the nature of the intrusion or attack and the determined probability of the likelihood of intrusion or attack based on the statistical models of said individual computers.

32. The method of claim 18, each agent further receiving warnings and potential countermeasures from agents of other of said individual computers in said computer network when the determined probability of the likelihood of a intrusion or attack exceeds a statistical threshold, wherein at least one of said warnings comprises information related to the nature of the intrusion or attack and the determined probability of the likelihood of intrusion or attack based on the statistical models of said individual computers.

33. The system of claim 30, each agent further receiving warnings and potential countermeasures from other of said individual computers in said computer network when the determined probability of the likelihood of an intrusion or attack exceeds a statistical threshold, wherein at least one of said warnings comprises information related to the nature of the intrusion or attack and the determined probability of the likelihood of intrusion or attack based on the statistical models of said individual computers.

* * * * *